May 21, 1935.  G. H. LECARPENTIER  2,002,183
COMBINATION THERMOMETER AND HYDROMETER
Filed Feb. 6, 1930   3 Sheets-Sheet 1
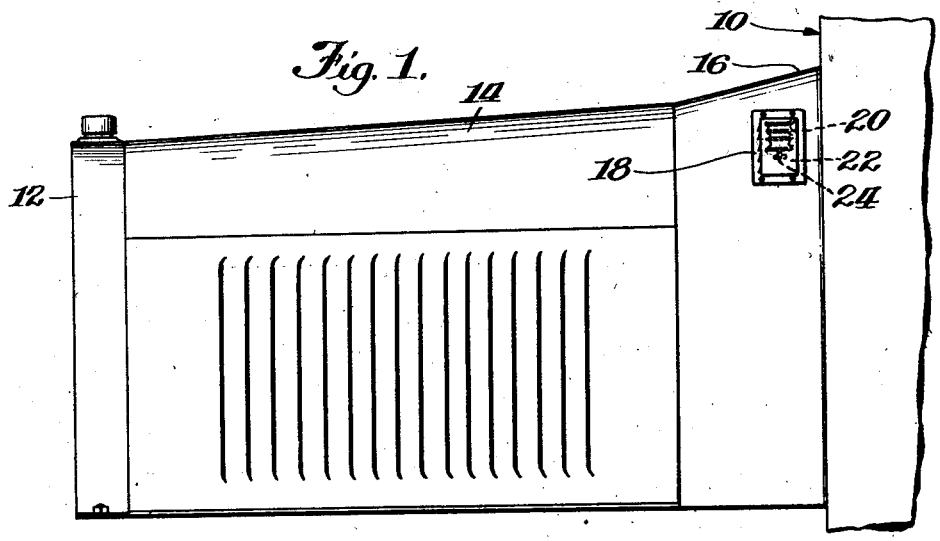
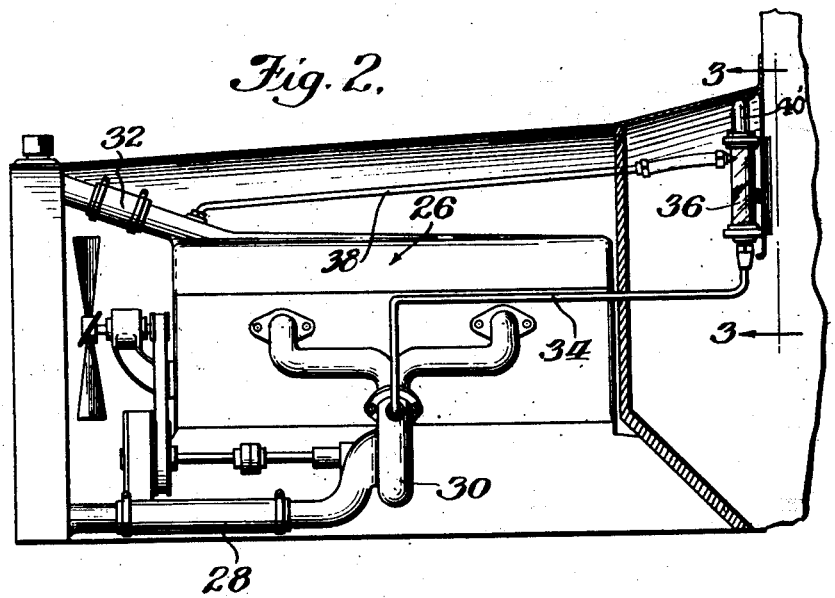

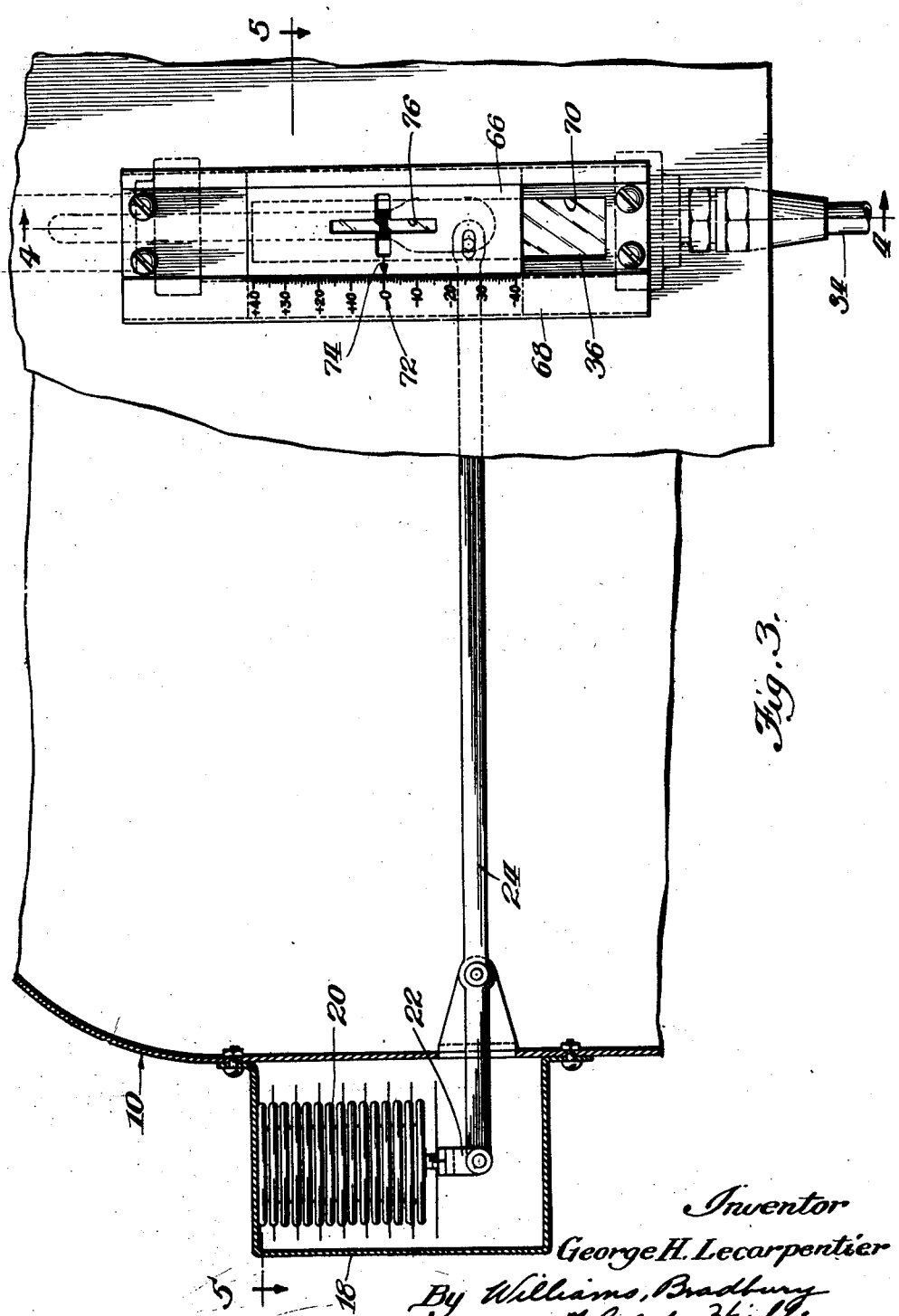

May 21, 1935.  G. H. LECARPENTIER  2,002,183
COMBINATION THERMOMETER AND HYDROMETER
Filed Feb. 6, 1930  3 Sheets-Sheet 3
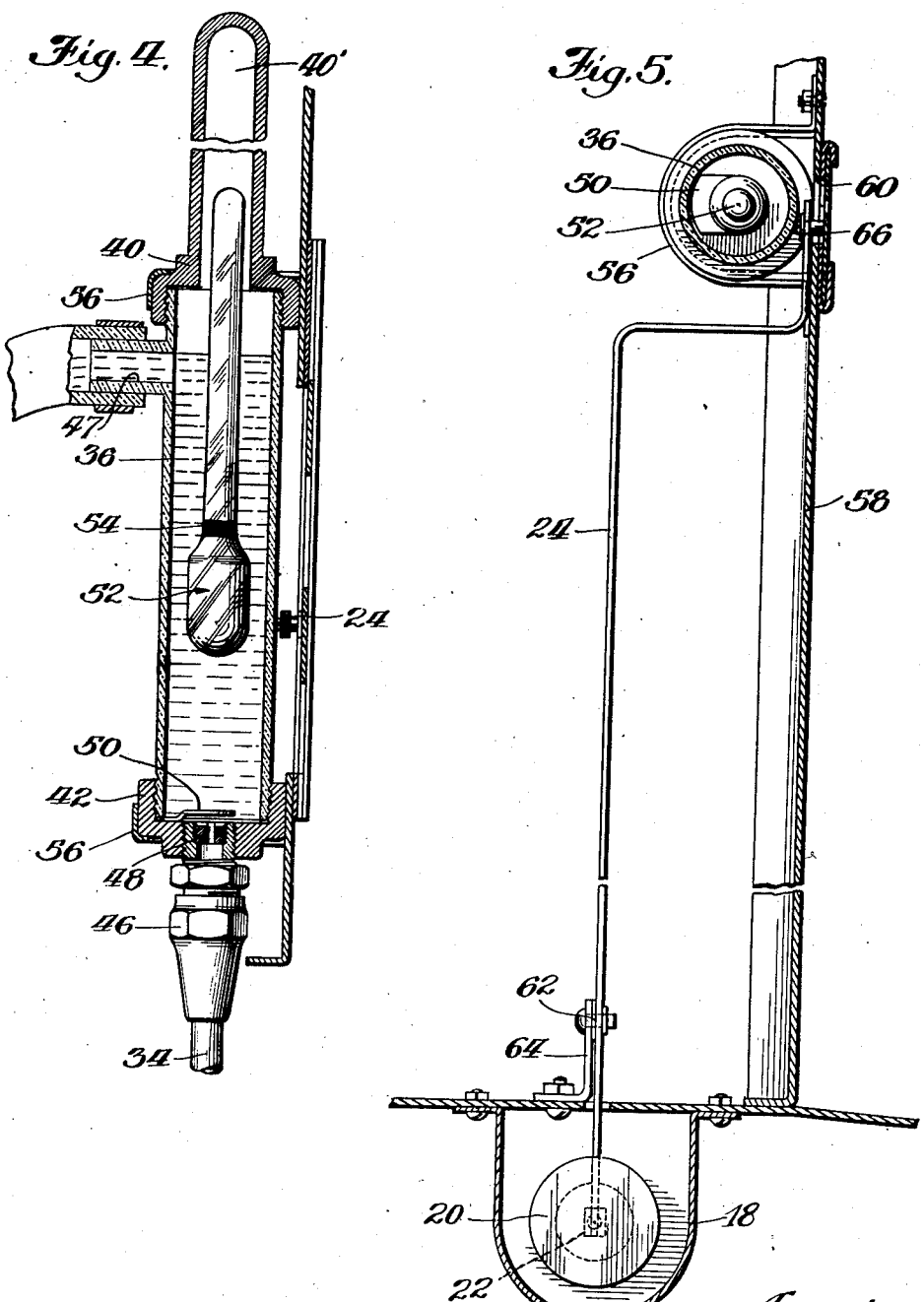

Patented May 21, 1935

2,002,183

UNITED STATES PATENT OFFICE 2,002,183

COMBINATION THERMOMETER AND HYDROMETER

George H. Lecarpentier, Chicago, Ill., assignor, by direct and mesne assignments, to Albert G. McCaleb, Evanston, Ill.

Application February 6, 1930, Serial No. 426,210

17 Claims. (Cl. 265—46)

My invention relates to safety devices for automotive vehicles and the like, and more particularly to a device that will constantly indicate whether or not the engine cooling solution in the radiator is in danger of freezing.

It is an object of my invention to provide a new and improved device of the type specified, which indicates the outside temperature in relation to the specific gravity of the solution so that it is at all times apparent whether or not the solution is in danger of freezing at the instant temperature.

Other objects and advantages will appear from the following description, reference being had to the accompanying drawings, in which Fig. 1 is a side elevation of a fragment of an automobile showing the engine hood, the temperature indicating device, and part of the body;

Fig. 2 is a more or less diagrammatic longitudinal section of an automobile showing the engine compartment and part of the driving compartment;

Fig. 3 is a fragmentary sectional view on line 3—3 of Fig. 2, parts being broken away in section to show other parts;

Fig. 4 is a vertical sectional view of the hydrometer and sliding panel and is taken on line 4—4 of Fig. 3; and Fig. 5 is a horizontal sectional view of the same parts and others associated therewith, and is taken on line 5—5 of Fig. 4.

In Fig. 1 of the drawings I have shown a fragment of an automobile 10 having the usual radiator 12, hood 14 and cowl 16. A housing or container 18 is mounted at a convenient place on the body near the cowl. A thermostat consisting of a temperature actuated metal bellows 20 is positioned in this housing, having an unsecured end 22 to which a lever 24 is attached which extends into the interior of the automobile.

Underneath the hood 14 an automobile engine 26 is shown provided with the usual circulating liquid type cooling system including an outlet conduit 28 extending from the bottom of radiator 12 through pump 30 into the water jacket of the engine and a return conduit 32 extending from the top of engine 26 to the upper part of radiator 12.

An auxiliary circulation line extends from the pressure side of pump 30 through conduit 34, chamber 36 and conduit 38 to a point in line 32. Thus it will be apparent that a portion of the fluid in radiator 12 does not pass through the water jacket of the engine but rather passes through the auxiliary line. Chamber 36 may be in the form of a transparent tubular member, preferably of glass, having end pieces 40 and 42 rigidly secured thereto, with suitable gaskets interposed to provide a fluid-tight seal. The conduit 34 is connected to the end piece 42 by suitable connection bushing 46. A circular nut 48 having a restricted opening is screw-threaded into the connector bushing 46. A baffle plate 50 is soldered to the end piece 42 overlying the restricted opening in nut 48. In order to accommodate the stem of the hydrometer the upper end piece may be provided with a hollow extension 40' as shown in Fig. 4. The conduit 38 is connected, for example by means of a hose 44, to an overflow pipe 47 formed on the chamber 36.

A hydrometer 52 of any ordinary type that has a weighted bottom end, is placed in the chamber 36. The hydrometer has a wide circular band 54 near its upper end which may be red or any other vivid color for a purpose to be explained later.

Chamber 36 is supported upon brackets 56 extending from the instrument panel 58 of the automobile and mounted directly behind an opening 60 therein.

By referring to Figs. 3 and 4, it will be seen that lever 24, which is pivoted at 62 on a bracket 64, passes through an opening 64 in the wall of the automobile body and extends to a point near opening 60 in the instrument panel where it is attached to a slidable panel 66. Panel 66 is positioned on the front side of the instrument panel in a vertical guide member 68. The guide member has a rectangular opening 70 through which chamber 36 is visible when panel 66 is removed. One side of the guide member has a scale or calibration 72 along its edge which, in the present device as shown, runs from —40 to +40. Panel 66 has stamped or printed thereon an indicating arrow 74 and is provided with a cross-shaped opening 76, the horizontal portion of which is in alignment with the arrow 74.

Assuming that it is freezing weather and a mixture of alcohol and water has been placed in the circulating system, as the automobile engine runs liquid from the circulating system will pass through chamber 36 and float hydrometer 52. The location of the hydrometer will depend on the specific gravity of the liquid.

The temperature controlled metal bellows 20, will contract in falling temperatures, and through lever 24 will move panel 66 until arrow 74 indicates the outside temperature on scale 72. The red band 54 on the hydrometer is visible through the opening 76. If the red band is below the horizontal part of the opening 76, the driver at once knows there is sufficient alcohol in the mixture for the prevailing temperature. If the band 54 moves into the horizontal part of the opening 76, or above same, which may be occasioned by fall of the outside temperature or increase of density of the cooling solution due to evaporation of alcohol, the driver is informed that his radiator is in danger of freezing. He thereupon adds alcohol in sufficient quantity to bring the band 54 below the horizontal part of the opening 76.

As the automobile is driven rapidly on a cold day the wind resistance at the radiator lowers the temperature and correspondingly the temperature of housing for metal bellows 20 will be lowered, affecting the bellows and causing it to show a lower reading on panel 66. Thus it will be seen that the temperature indicated will correspond with the actual temperature encountered by the radiator.

It will be seen that the band on the hydrometer and the slot on the thermometrically actuated sliding plate constitute a common mechanism responsive to both the hydrometric device and the thermometric device to indicate freezing hazard, i. e., the danger of the solution freezing if reduced to prevailing atmospheric temperature. In using the phrase "a common mechanism responsive to both the hydrometric device and the thermometric device," I contemplate that the phrase would not embrace a mere optically convenient juxtaposition of a thermometric indicator and a hydrometric indicator each working over its own scale where one does not constitute an index reference for the other, but that it would embrace an arrangement where the devices or their indicators jointly influence a common indicator or detector, such as a direct reading pointer, indicating or detecting the freezing hazard.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A safety system for a vehicle including an engine having a circulating cooling system, an auxiliary circulating system, a chamber in said system, a hydrometer in said chamber, a vertically slidable panel mounted in front of said hydrometer chamber, said panel having a reading aperture, a thermostatic unit mounted on the outside of the vehicle, and an operating lever for said panel actuated by said thermostatic unit.

2. In combination with an engine and a liquid circulating cooling system therefor, an auxiliary circulating system, a chamber in said auxiliary system, a hydrometer in said chamber, an indicating panel vertically movable in front of said chamber, there being an aperture in said panel, a lever attached to said panel for vertical reciprocation, and a thermostatically controlled unit mounted outside of the vehicle, said lever being attached at its outer end to said thermostatic unit.

3. A safety device for a vehicle including an engine, a circulating system, a chamber connected so as to receive liquid continuously from said circulating system when the engine is running to maintain a constant level in said chamber and to return said liquid to said system, a hydrometric member in said chamber to indicate the specific gravity of the liquid therein, and a member movable in response to the prevailing temperatures of the atmosphere, one member being arranged in reference index relation to the other.

4. A safety device for a vehicle including an engine, a circulating system, a chamber connected so as to receive liquid continuously from said circulating system when the engine is running to maintain a constant level in said chamber and to return said liquid to said system, a hydrometer in said chamber to indicate specific gravity of the liquid therein, and means including a panel movable under the influence of a temperature responsive element for indicating the prevailing atmospheric temperature in correlation with the hydrometer reading, said panel being movable adjacent said hydrometer and adapted to expose a certain part of the hydrometer when there exists a predetermined relationship between prevailing atmospheric temperature and the specific gravity of the liquid.

5. In combination with a liquid circulating system, an auxiliary circulating system associated therewith, a chamber in said auxiliary system, a hydrometer confined in said chamber, a vertically slidable indicating panel mounted adjacent said chamber, and means responsive to atmospheric temperature for moving said panel to provide a reading scale for said hydrometer.

6. In a liquid cooling system for an internal combustion engine, a hydrometer confined in said system, said system comprising a transparent element through which said hydrometer is visible, a vertically slidable reading scale positioned adjacent said hydrometer, a unit actuated by atmospheric temperature, and means connecting said temperature actuated unit with said scale to provide a reading of said hydrometer in relation to the actual temperature.

7. In a cooling system for an internal combustion engine, a circulating system having cooling fluid therein, a hydrometer confined in the circulating system subject to the specific gravity of the fluid therein, said system comprising a transparent portion through which said hydrometer is visible, temperature responsive means located externally of said cooling system, and means connected to and operable by said temperature responsive means to indicate the existing external temperature, said means being in reference index relation to the hydrometer.

8. In a cooling system for an internal combustion engine, a circulating system having a cooling liquid therein, hydrometer means confined in the circulating system subject to the specific gravity of the liquid therein, said system comprising a transparent portion through which said means is visible, temperature responsive means located externally of said cooling system, and means for detecting the liquid freezing hazard which means are connected to and operable by said temperature responsive means and arranged in reference index relation to the hydrometer means.

9. In an internal combustion engine, a liquid cooling system, means continuously receiving liquid from said system, means in contact with and responsive to the specific gravity of the liquid, and means responsive to the prevailing air temperature arranged in reference index relation to the specific gravity responsive means to indicate freezing hazard of the liquid if reduced to the prevailing temperature of the atmosphere.

10. In an internal combustion engine, a liquid cooling system, an auxiliary circulating system continuously receiving liquid from said cooling system, means responsive to the specific gravity of the liquid, means responsive to the prevailing air temperature, and a member movable by one of said means in index reference relation to the other of said means to afford an indication of specific gravity in correlation to an indication of existing temperature to indicate, in turn, liquid freezing hazard in the cooling system.

11. In a liquid cooling system for an internal combustion engine, a first means actuated by variation of specific gravity of the cooling solution, means defining an opening through which the aforesaid means may be observed, and means actuated by atmospheric temperature adapted to shift the second means aforesaid.

12. A freezing hazard indicator comprising two indicating members juxtaposed and both movable, a first means, responsive to the specific gravity of liquid in a vehicle engine circulating system, adapted to shift one of said indicating members in accordance with specific gravity variations, and a second means, responsive to prevailing atmospheric temperature, adapted to shift the other indicating member in accordance with variations in prevailing atmospheric temperature, said indicating members, by their relative positions, indicating whether or not the specific gravity of the liquid is such that it may be permitted without danger of freezing to have its temperature lowered to that of the atmosphere.

13. The combination with the liquid solution cooling system of the engine of an automotive vehicle, of an apparatus directly determining danger of the liquid solution freezing if reduced to the prevailing atmospheric temperature, comprising in combination a hydrometric device subject to, and operating in response to the density of, the liquid solution and a thermometric device subject to, and operating in response to, the prevailing temperature of the atmosphere, and a common detecting mechanism responsive to both devices for detecting such danger.

14. A liquid freezing hazard detector comprising a hydrometric device acting in response to the specific gravity of a body of liquid, and a thermometric device acting in response to the temperature of the surrounding atmosphere, each device having a movable portion, the movable portions moving relatively to each other and each constituting a reference index for the other whereby certain positions of one relative to the other detect whether the liquid would freeze at the temperature of the surrounding atmosphere.

15. A liquid freezing hazard detector comprising a hydrometric device acting in response to the specific gravity of a body of liquid, and a thermometric device acting in response to the temperature of the atmosphere, the hydrometric and thermometric devices each having a movable portion, the movable portions moving relatively to each other and each constituting a detector actuating complement for the other whereby the portions constitute a freezing hazard detector device wherein change in position of one relative to the other actuates the detector device to detect whether the liquid would freeze at the temperature of the surrounding atmosphere.

16. The combination with the liquid solution cooling system of the engine of an automotive vehicle, of an apparatus directly determining danger of the liquid solution freezing if reduced to the prevailing atmospheric temperature, comprising in combination a hydrometric device subject to, and operating in response to the density of, the liquid solution and a thermometric device subject to, and operating in response to, the prevailing temperature of the atmosphere in cooperating detector relationship, whereby they constitute a detector for such hazard, with an increase in the density of the solution and an increase in the temperature of the surrounding atmosphere oppositely affecting the detector.

17. The combination, with a body of liquid exposable to atmospheric temperature and constituting the circulating medium, of an automobile engine, a liquid comprising water and an antifreeze ingredient mixed therewith to lower the freezing temperature of the liquid below that of water, the specific gravity and the freezing temperature of the liquid varying with different proportions of the water and the anti-freeze ingredient, a hydrometric device subject to the liquid and controlled by the specific gravity thereof, a thermometric device subject to the prevailing atmosphere and controlled by the temperature thereof, a freezing hazard detector device for the liquid, and control imparting means between the detector device and the hydrometric and thermometric devices constructed and arranged for control of the detector device jointly by said hydrometric and thermometric devices with the detector device acted upon oppositely, as regards its freezing hazard detection, by the hydrometric device upon a change in specific gravity of the liquid associated with an increase in its freezing temperature and by the thermometric device upon an increase in prevailing atmospheric temperature.

GEORGE H. LECARPENTIER.